(12) United States Patent
Bass

(10) Patent No.: US 6,571,266 B1
(45) Date of Patent: May 27, 2003

(54) METHOD FOR ACQUIRING FMAC ROUNDING PARAMETERS

(75) Inventor: Stephen L Bass, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/510,284

(22) Filed: Feb. 21, 2000

(51) Int. Cl.[7] .................................................. G06F 7/38
(52) U.S. Cl. ...................................................... 708/501
(58) Field of Search ................................. 708/523, 497, 708/501, 205, 104, 204, 552

(56) References Cited

U.S. PATENT DOCUMENTS

| | | | | |
|---|---|---|---|---|
| 4,150,434 A | * | 4/1979 | Shibayama et al. | 708/104 |
| 4,852,037 A | * | 7/1989 | Aoki | 708/523 |
| 4,866,652 A | * | 9/1989 | Chu et al. | 708/501 |
| 4,969,118 A | * | 11/1990 | Montoye et al. | 708/501 |
| 5,241,493 A | * | 8/1993 | Chu et al. | 708/501 |
| 5,644,519 A | * | 7/1997 | Yatim et al. | 708/523 |
| 5,757,686 A | * | 5/1998 | Naffziger et al. | 708/501 |
| 5,757,687 A | * | 5/1998 | Naffziger et al. | 708/501 |
| 5,796,644 A | * | 8/1998 | Jiang | 708/205 |
| 5,880,984 A | * | 3/1999 | Burchfiel et al. | 708/497 |
| 5,892,698 A | * | 4/1999 | Naffziger | 708/501 |
| 6,115,729 A | * | 9/2000 | Matheny et al. | 708/501 |

FOREIGN PATENT DOCUMENTS

JP  409231201 A  *  9/1997  .......... G06F/17/10

* cited by examiner

*Primary Examiner*—Chuong Dinh Ngo
*Assistant Examiner*—Chat C Do

(57) ABSTRACT

A floating-point multiply accumulate method acquiring a final mantissa result comprises comparing exponents of (A*B) and C. Transferring part of the C mantissa to a CHI register. Shifting any part of the C mantissa which overlaps the range of the (A*B) mantissa to align the bits of the (A*B) and C mantissas. Adding the shifted part of the C mantissa to the (A*B) mantissa. Shifting least significant bits corresponding to a number of bits transferred to the CHI register out of the Temp. Result. Mask merging bits of the C mantissa which were transferred to the CHI register with most significant bit positions of the shifted Temp. Result. Rounding this mantissa result to the first precision and acquiring L from an Lbit value of the CHI register or an Lbit value of the Temp. Result based on the bit value of the merge mask corresponding to the Lbit position.

19 Claims, 6 Drawing Sheets

METHOD FOR ACQUIRING FMAC ROUNDING PARAMETERS

TECHNICAL FIELD

The present invention relates generally to floating point processing. In particular, the present invention relates to a method for adding the input addend in an FMAC (floating-point multiply accumulate) procedure.

BACKGROUND

In the design of microprocessor architecture, three very important considerations are speed, accuracy and cost. While it is desirable to design a microprocessor (CPU) which performs multiplication, addition and other operations with superior accuracy and at a very high rate of speed, it is also desirable to design a CPU which can be cost effectively manufactured. Speed and accuracy have been greatly increased in RISC (reduced instruction set computer) CPUs by fusing multiply and add operations into the multiply accumulate operation (A*B)+C. If it is desired to merely add or multiply two numbers, the operation A*B can be performed by setting C=0, and the operation A+C can be performed by setting B=1. The component of a CPU which performs the (A*B)+C operation is commonly referred to as an FMAC (floating-point multiply accumulate unit) or MAF/FPU (multiply-add-fused floating-point unit).

The inputs to an FMAC are the operands A (multiplicand), B (multiplier) and C (addend), where A, B and C may be fixed or floating-point numbers (floating-point numbers are numbers expressed in scientific notation). The IEEE conventions for representing single-precision (32-bit), double-precision (64-bit), and extended-precision (82 bit) floating-point numbers in binary form is [S, E, M], where S is a single bit representing the sign of a number, E is a multi-bit value (e.g., 17 in extended precision) corresponding to an exponent (which may be offset by a bias), and M is a mantissa (or the fractional portion of a normalized value either stripped of or including its leading 1). (In this specification, it can be assumed that any expressed mantissa includes its leading 1.) Thus, the form of a floating-point number is $S*M*2^{(E-bias)}$. With single precision, M is represented by 24 bits; with double-precision, M is represented by 53 bits; and with extended precision, M is represented by 64 bits.

In carrying out the (A*B)+C operation, the FMAC initially multiplies A and B together resulting in an A*B value that is stored in a corresponding register. In most systems, a sufficiently wide data path is used for this multiplication step such that the resulting A*B mantissa has twice the bits of a single valued mantissa. For example, in an extended precision system, the A*B is normally 128 bits wide. The A*B value is then added to the C addend. With particular relevance to the present invention, a crucial step in adding these values involves adding the A*B mantissa to the C mantissa to acquire the mantissa result. U.S. Pat. No. 5,757,686 to Naffziger et al. (which is hereby expressly incorporated by reference into this specification) teaches a valuable method that minimizes the required data-path for performing this mantissa addition step.

The final step in the FMAC process is rounding the final mantissa result to the desired bit position. In extended precision, the mantissa value is rounded to 64 bits. Likewise, with double precision (DP), the value is rounded to 53 bits, and in single precision (SP), the mantissa is rounded to 24 bits. With double and single precision in register file format (which has 64 bit slots for the mantissa), the lower slots (i.e., 11 and 40, respectively) are padded with "0"s. Everything else that is rounded off of the resulting mantissa is discarded or used for the rounding calculation, which determines whether or not to increment or decrement the mantissa result.

In conventional rounding techniques, three values (L, G, and S) are typically used to perform the rounding calculation. The least significant bit of the result mantissa (prior to rounding) is the L value. The bit directly to the right of L is the G value, which is known as the guard bit. Everything to the right of G goes into the determination of S, which is known as the "sticky." The sticky is basically just an OR'ing of each of the bits to the right of G (including those that fall off, as will be addressed below). So, S is basically just a single-bit value, which is true if any bit to the right of G is 1.

FIG. 1 shows an FMAC 20 for adding the mantissa's of A*B and C. A, B, and C 22, 24, 30, each comprising an m-bit mantissa and an exponent, and the (A*B) result 28 comprising a "2m+1"-bit mantissa and an exponent, is described herein. FMAC 20 generally comprise a CHI register 32, coupled to means for transferring bits of the C mantissa 30 which exceed a range of the (A*B) mantissa 28 to the Result 44; a CBUS register 36, coupled to an alignment shifter 34 for placing bits of the C mantissa 30 which overlap the range of the (A*B) mantissa 28 into the CBUS register 36, the overlapping bits contained within the (A*B) and CBUS registers 28, 36 being aligned for adding; an adder 38, coupled to the (A*B) and CBUS registers 28, 36, and providing an (A*B)+CBUS output 46; a leading bit anticipator (LBA) 40 connected to the (A*B)+CBUS output 46 of the adder 38; a normalization shifter 42, coupled to the leading bit anticipator 40, and providing a normalized temporary output 48; and means for merging those bits of the CHI register 32 comprising bits of the C mantissa 30 which exceed the range of the (A*B) mantissa 28 with one or more most significant bits of the temporary output 48 to produce an (A*B)+C accumulate output 44.

With reference to FIGS. 2–5, respectively, there are four general cases for adding the A*B and C mantissas based on the relative differences of their associated exponents. The first case is when EXP(C) is sufficiently less than EXP(AB) such that the mantissas do not overlap when being added. The second case is when EXP(C) is less than EXP(AB), but they overlap such that there is some interaction when they are added. The third case is when EXP(C) is greater than EXP(AB), but they overlap such that they interact when added. Finally, the fourth case, which is referred to as the "Big C" case, occurs when EXP(C) is sufficiently larger than EXP(AB) such that they do not overlap and there is no interplay when they are added. After an (A*B) result 28 is created, the magnitude of the (A*B) 28 and C 30 exponents are compared to determine which of four possible cases exists.

FIGS. 2–5 show the adding methods for the above-described four cases. The method generally comprises the steps of comparing the exponents of (A*B) 28 and C 30 to determine whether there is an overlapping range of the (A*B) 28 and C 30 mantissas; transferring any part of the C mantissa 30 which exceeds a range of the (A*B) mantissa 28 to a CHI register 32; shifting any part of the C mantissa 30A that overlaps the range of the (A*B) mantissa 28 in the C bus 36 and zeroing out the remaining portion of C Bus 36, so as to align the bits of the (A*B) 28 and C 30 mantissas according to their respective magnitudes; if not in case 4, adding the C Bus 36 to the (A*B) mantissa 28 to generate a temporary result 46; if a portion of the C mantissa was transferred to the CHI register 32, right shifting the Temp. Result 46 such that one or more least significant bits corresponding to a number of bits transferred to the CHI register 32 out of the temporary result to generate a Shifted Temp. Result 48; and merging with a merge mask 47 the bits of the CHI register 32, which correspond to the C mantissa exceeding the A*B mantissa, with one or more most significant bit positions of the shifted temporary result 48 to generate a final accumulate result 44.

With reference to FIG. 2, case one will now be considered. In case one (FIG. 2), EXP(C) is sufficiently less than EXP(AB) such that when their exponents are compared and their mantissas aligned, there is no overlapping between AB 28 and C30. This results with no contribution from C (other than for sticky calculation) for the Final Mantissa Result 44. With C 30 being completely to the right of A*B 28, the C Bus 36 is filled with 0's. The CHI register 32 plays no role in this case because no portion of C is higher than (falls to the left of) A*B 28. The contents of A*B register 28 and the C Bus 36 are added with the result placed in Temp Result register 46. The Temp. Result 46 and CHI 32 (which has no role in this case) are then merged together with Merge Mask 47 to produce the Final Mantissa Result 44. The values in the Merge Mask 47 are based on the difference between the AB and C exponents. The merge mask is aligned with the Temp. Result register 46 and the CHI register 32; in each bit location, it either has a 0 for selecting the corresponding CHI bit or a 1 for selecting the corresponding Temp. Result (A*B+C) bit. In this case where no portion of C falls to the left of A*B 28, the merge mask 47 has all 1's for entirely selecting the Temp. Result register 48. Only the A*B mantissa 28 contributes to the Final Result 44, and the C mantissa 30 is used only for acquiring the sticky value.

With reference to FIG. 3, case 2 will now be described. In case two, EXP(C) is less than EXP(AB), but when properly shifted in adding alignment, a portion 30A of C overlaps with A*B 28. As with case 1, the portion 30B of C that falls off (in this case to the right) is only used for determining the sticky value and then discarded. With C 30 shifted as shown in the drawing, the C Bus 36, in its least significant portion, includes the part of C 30A that overlaps the A*B mantissa 28. The rest of the C bus 36 is filled with 0's. For this case, the CHI register 32 again plays no role in the determination of the Final Result 44. The contents of the A*B register 28 and the C Bus 36 are then added and placed in Temp Result register 46. The Temp. Result 48 and CHI 32 are then merged together with the Merge Mask 47 to produce the Final Mantissa Result 44. Based on the exponent difference between AB and C, the merge mask again, with C being within or to the right of C, has all 1's for entirely selecting the Temp. Result register 48 for the Final Result 44.

With reference to FIG. 4, case 3 will now be considered. A number of bits 30C of C corresponding to the difference between the C 30 and (A*B) 28 exponents are transferred into the CHI register 32 in its most significant portion. The remaining least significant portion of the CHI register 32 is filled with ones. Once the high order bits of C 30 have been transferred to CHI 32, it matters not what remains in the high order bit positions of C 30. The remaining contents of C 30 are transferred to the C Bus 36. They are shifted left a number of bits corresponding to the difference of the C 30 and (A*B) 28 exponents. It can be seen that the high order portion, 30C, of C 30 is masked from C Bus 36, and the overlapping bits, 30A, of C 30 and (A*B) 28 are aligned. The less significant bits of C Bus 36 are filled with 0's. Having aligned the overlapping portion of C 30 with the (A*B) result 28, the Temp. result 46 is generated with the addition of A*B 28 and the C Bus 36. Sticky bit information may be used to round the Temp Result 46, and any carry out of Temp Result 46 may be used to increment CHI 32. (Note that since the less significant bits of CHI 32 are filled with ones, a carry from Temp. Result 46 will ripple through the less significant bits of CHI 32 into the bits of CHI 32 representing the high order portion of C 30.)

After obtaining Temp. Result 46, the Temp. Result 46 must be right-shifted via shifter 42 by a number of bits equal to the difference between the C 30 and (A*B) 28 exponents. The shifted Temp. result register is pictured at 48. The high order portion of C 30 contained in CHI 32 and the Shifted Temp. Result 48 are now merged with mask 47 to produce the Final Result 44. This time, based on the difference between the A*B and C exponents, the most significant bits (corresponding to the number of bits of C falling off of A*B) are now 0's for selecting the CHI register 32, and the remaining lower bits are 1's for selecting the Shifted Temp. Result 48.

With reference to FIG. 5, case 4 will now be addressed. This case, where C is sufficiently larger than A*B such that all of the result mantissa comes from C, is referred to as the "Big C" case. As will be discussed below, the Big C case is uniquely special because when it is identified, rounding calculations can more efficiently be performed. With C 30 falling completely to the left of A*B, all of C gets put into the CHI register 32. With the Big C case being identified, the shifting and use of the C Bus can be bypassed, and CHI 32 is directly merged into the Final Mantissa Result 44. The A*B mantissa only comes into play in the sticky calculation.

In prior art, input and output precision always matched. That is, even in systems with hardware having, for example, the capability to handle double (53 bit) precision, the output may have been required to be rounded to single precision. This was not a problem, however, because with the input and output precisions being guaranteed to match, the system would know that the input precision must also be single.

FIG. 6A shows an example of this type of situation. In this example, both the input and output values are known to be single-precision floating-point numbers. The C mantissa 130 is stored in a 53 bit register, and the A*B mantissa 128 is stored in a 106 bit register. The pertinent data (mantissa) is placed on the upper portions of the operand registers, and the lower bits padded with 0's. Thus, in the example of FIG. 6A, the upper 24 bits are the C mantissa, and the lower 29 bits are padded with 0's. It can be seen that because that lower portion of C, which is set to 0, is the only thing overlapping with A*B, there is basically no interaction between C and A*B other than the rounding interactions. Thus, it can be identified as a case four (or Big C) case. The important thing is that it can be classified into one of the four cases and processed accordingly. Thus, in the prior art, simply by knowing the output precision, the input precision was also known, and the case threshold could be appropriately set for properly identifying a given computation's case.

It was also a simple matter to determine L, G, and S. For example, with the Big C case, L is always a particular bit of C, i.e., the least significant bit of the mantissa. With the example of FIG. 6A, it would always be bit 30. G is always guaranteed to be 0, and sticky is just an OR'ing of A*B. If A*B is not 0, then S is true, and if it is 0, then S is false. When the Big C case is identified, it is easy to determine these values. However, in cases other than a Big C case, L, G, and S, could still be readily calculated using conventional methods for these other cases.

Thus, the above-described Naffziger algorithm, which removes the need for a 3N+1 data path width in cases 3 and 4, is an excellent algorithm—even when single precision values were being processed with double precision hardware. Because of that, L, G and S were easy to obtain. They were either obtained from the Big C case, or they were readily found exclusively from the Temp. Result (A*B+C) register.

Unfortunately, now, with IA64 architecture, which uses register file format (i.e., extended precision), the input and output precisions are not guaranteed to match. The input values are always in register file format. If the output is rounded to single or double precision, the lower bits on the input operands are not necessarily 0's. Thus, when the output is to be rounded to a smaller precision, the inputs cannot be assumed to have the corresponding precision. With a reduced precision output, the lower bits only get rounded off after the addition operation is performed. Thus, case thresholds can't be established for specific output precisions—as they could in the past—because, e.g., there is still interaction between the bits beyond the 24 (single precision) bits and the A*B bus. Thus, a L, G, and S can not be readily determined with the conventional algorithm by simply identifying the case. Now, rather than coming only from the Temp. Result register in determinable locations, L and G and some of sticky may come from the CHI bus. FIG. 6B shows an example that illustrates this problem. The C mantissa 170 exponent is greater than the A*B mantissa 168 exponent by 26 bits. For this case, assume that the rounding is to single precision. Thus, only 24 bits of the result mantissa will be kept. If it was known that the lower 40 bits were 0 because the number was guaranteed to be single precision, this case could be identified as a Big C case. However, there is interaction between those lower (not necessarily 0) bits and A*B.

Accordingly, what is needed is a method for obtaining the rounding parameters, L, G, and S, in an FMAC having an output precision that may be smaller than the input precision.

SUMMARY OF THE INVENTION

These and other objects, features and technical advantages are achieved by a system and method which in an m-bit precision system effectively acquires rounding parameters when the final mantissa result is rounded to a lower precision. A floating-point multiply accumulate unit is provided for performing the accumulate operation (A*B)+C. A, B, and C each comprise an m-bit mantissa and an exponent, and the (A*B) result comprises a "2m+1"-bit mantissa and an exponent. Also provided is a method for adding C to the (A*B) result to acquire a final mantissa result that is rounded to a first precision that is smaller than m. In one embodiment, the method includes the following acts. Comparing the exponents of (A*B) and C to determine whether there is an overlapping range of the (A*B) and C mantissas. Transferring any part of the C mantissa which exceeds a range of the (A*B) mantissa to a CHI register. Shifting any part of the C mantissa which overlaps the range of the (A*B) mantissa, so as to align the bits of the (A*B) and C mantissas according to their respective magnitudes. Adding the shifted part of the C mantissa to the (A*B) mantissa to generate a Temp. Result.

If a portion of the C mantissa was transferred to the CHI register, then shifting one or more least significant bits corresponding to a number of bits transferred to the CHI register out of the Temp. Result. Merging with a merge mask the bits of the C mantissa which were transferred to the CHI register with one or more most significant bit positions of the shifted Temp. Result to generate an accumulated 1 mantissa result. Acquiring L from a selected one of an Lbit value of the CHI register and an Lbit value of the Temp. Result based on the bit value of the merge mask corresponding to the Lbit. Finally, rounding the mantissa result to the lower precision using one or more rounding parameters including a leading bit (L).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
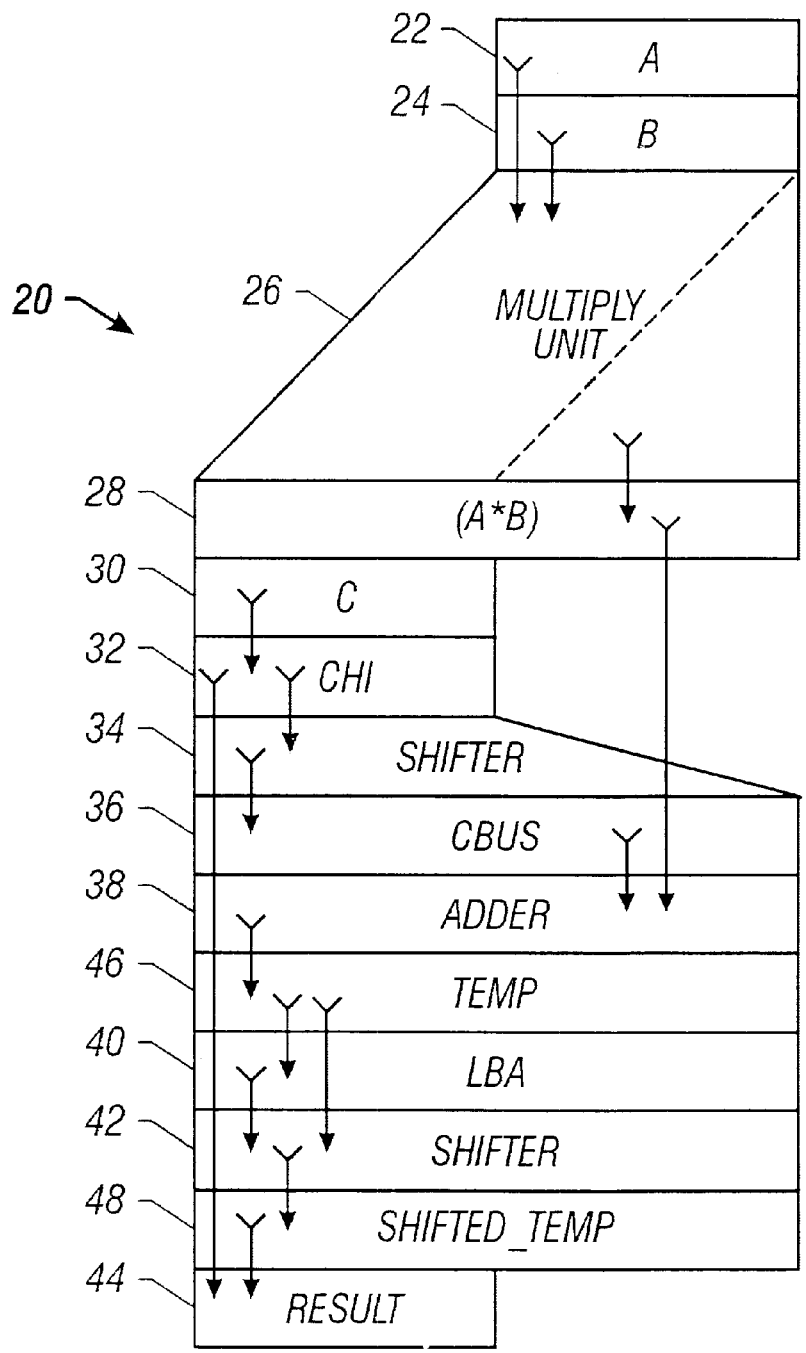
FIG. 1 is a schematic of an FMAC.
Figure 2:
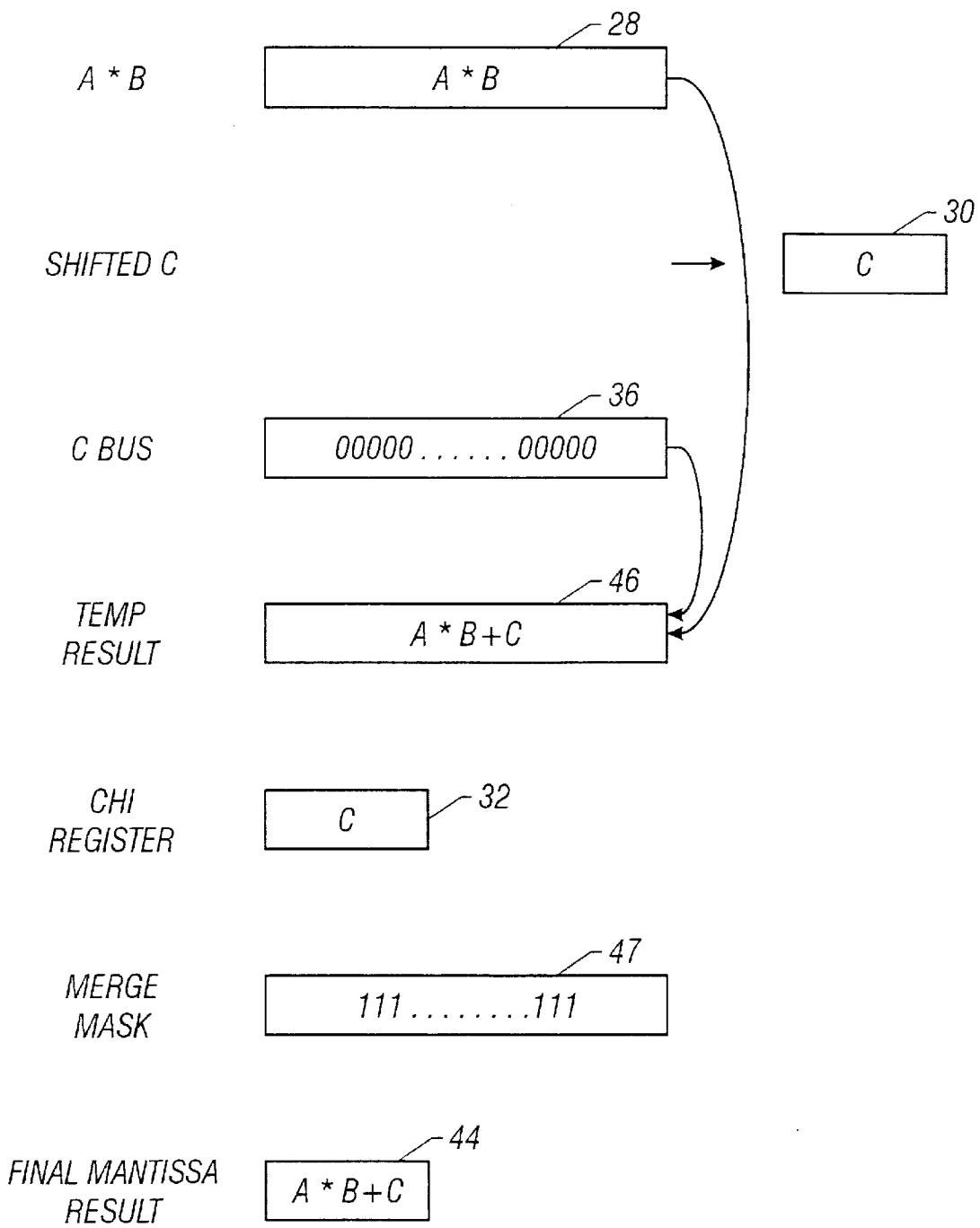
FIG. 2 shows the flow of data through an FMAC when EXP(C) is substantially less than EXP(A*B)
Figure 3:
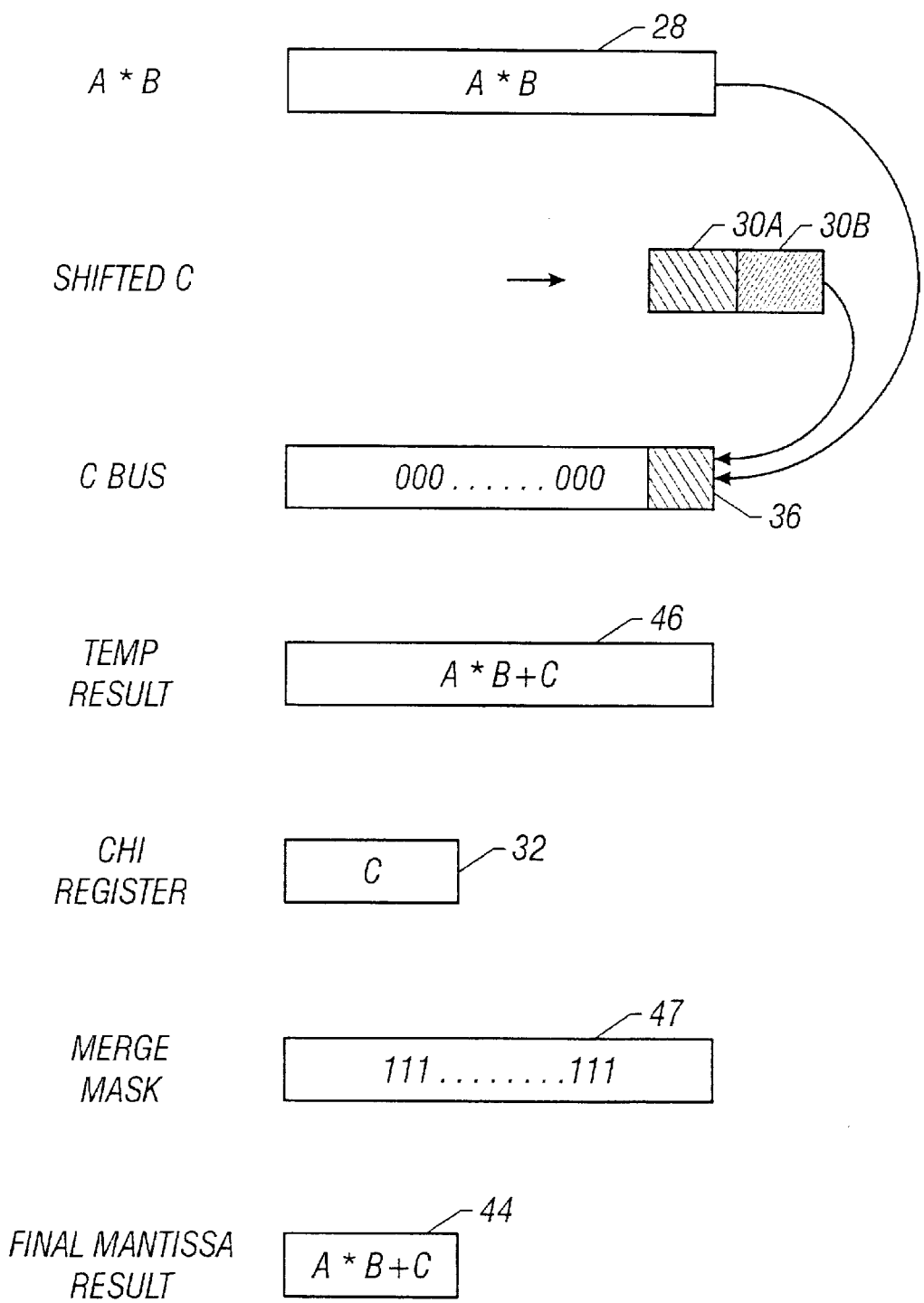
FIG. 3 shows the flow of data through an FMAC when EXP(C) is less than EXP(A*B) and at least some of C overlaps with A*B.
Figure 4:
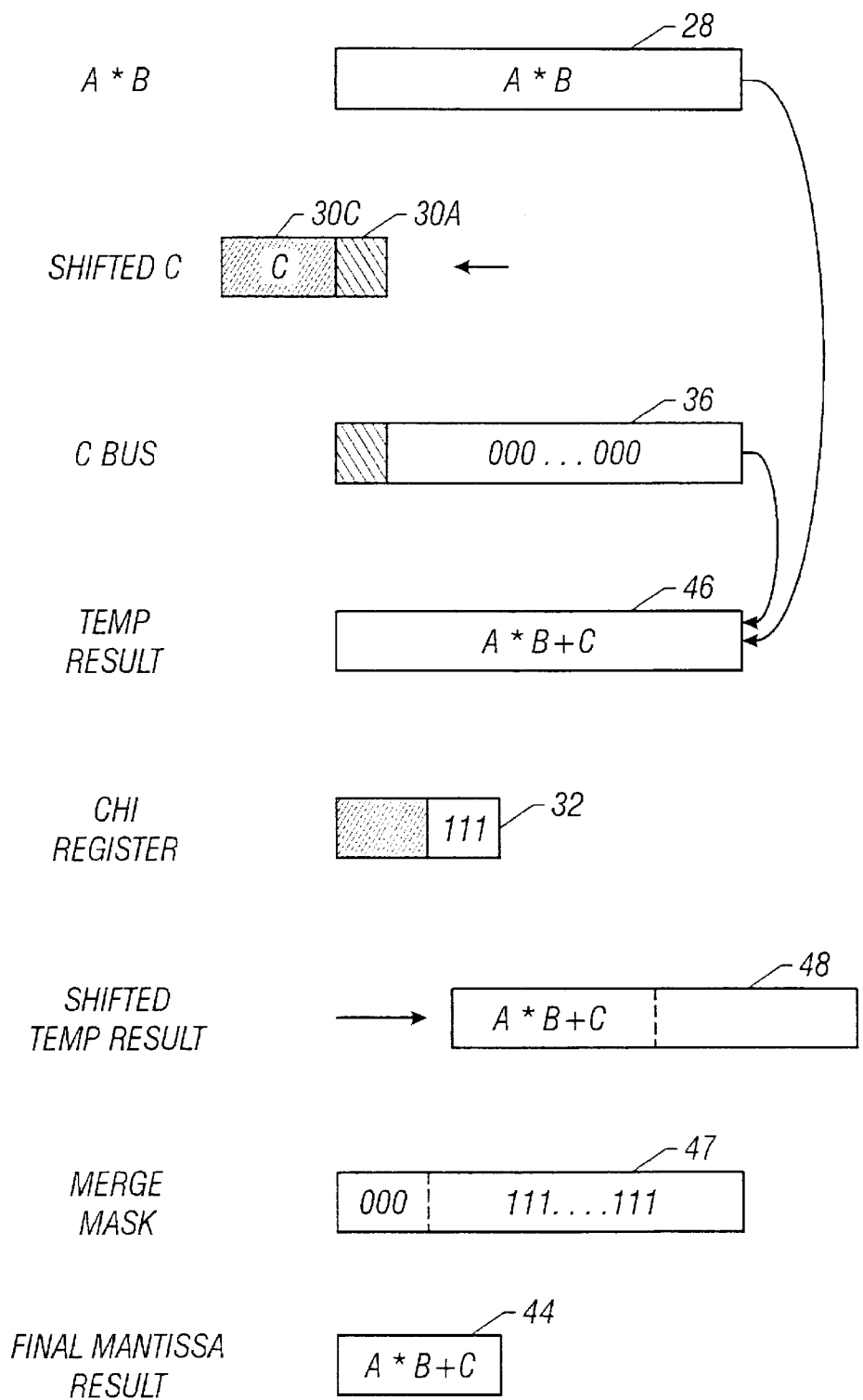
FIG. 4 shows the flow of data through an FMAC when EXP(C) is greater than EXP(A*B) and at least some of C overlaps with A*B.
Figure 5:
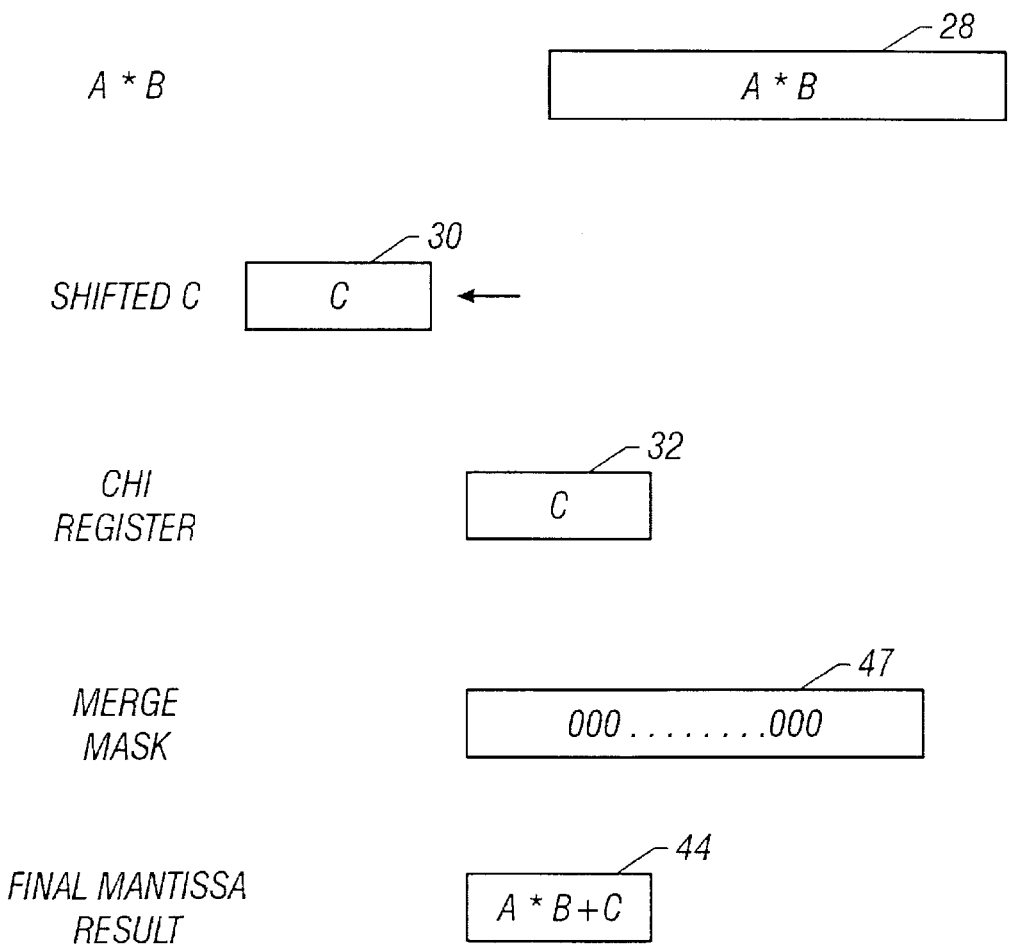
FIG. 5 shows the flow of data through an FMAC when EXP(C) is substantially greater than EXP(A*B)

The present invention provides a scheme for readily determining L, G, and S when the output precision is less than the input precision. With the exception of the Big C case, the method is independent of the particular case. The operation of selecting L, G, and S is performed as if it were case 3, and L, G, and S are determined as set forth herein.

When C is greater than A*B and a case 3 operation is performed, L, G and S are fixed relative to the Final Mantissa Result bus. The Result bus will be in the same position. In turn, the CHI bus is also fixed relative to the result bus. Thus, L, G and S will also be fixed relative to CHI. Because of the fact that L, G and S are fixed relative to CHI, particular bits out of CHI can be used to determine L, G and S, regardless of whether they are actually used. Likewise, the A*B+C (Temp. Result) bus can be used to determine which bits may be L, G and S even if the bits are not actually used. The merge mask can then be used. It not only picks which data is used for the Final Result, but also, it can be used to identify whether L, G, and S should be picked from the CHI bus or the Temp. Result (A*B+C) bus.

In summary, the basis of the solution is to use the merge mask, combined with knowing that the CHI bus has to be considered as a source for some of this information, to select the L, G and S either from the CHI bus or from the Temp. Result (A*B+C) bus. L, G and S can come from either the CHI bus or the Temp Result bus. The merge mask is used to identify which of these sources to use.

Again, L is the least significant bit of a value, G is the bit to the right of L, and S (sticky) is the logical OR of all bits to the right of G. Thus, when rounding to single precision in an extended precision system, L corresponds to bit 40, G corresponds to bit 39, and S is the logical OR of all bits to the right of bit 39. When rounding to double precision, L corresponds to bit position 11, G to bit position 10, and S to the logical OR of all bits to the right of bit position 10. These positions will be referred to as the Lbit, Gbit, and Sbits, respectively, independent of the precision, which would be taken into account. With these bit position constants (for a given precision), L and G can be determined using the following formulas.

$L=(CHI[Lbit]$ AND NOT Mask[$Lbit$]) OR (Temp Result[$Lbit$] AND Mask[$Lbit$]);

$G=(CHI[Gbit]$ AND NOT Mask[$Gbit$]) OR (Temp Result[$Gbit$] AND Mask[$Gbit$]);

S is determined somewhat differently. It can come from both the CHI bus, as well as the Temp. Result bus. Sticky needs to be calculated looking at the Sbit and lower portion of the CHI bus that were part of C. In order to get these bits from the CHI bus for the sticky calculation, the lower part of CHI, corresponding to the part of C where C overlaps A*B is set to 0's. This is done by AND'ing each bit of CHI with the inverse of the corresponding bit in the merge mask. That is:

$CHISTICKY[N:0]=CHI[N:0]$ AND NOT Mask[$N:0$]

This allows the sticky contribution from the CHI bus to be obtained by simply OR'ing The CHI STICKY bus from the Sbit on downward. With single precision, this would be from bit 38 on down, and with double precision, it would be from bit 9 on down. for the Temp. Result's contribution, the normal sticky logic can be implemented (i.e., OR'ing the Temp. Result bus). Thus, the final sticky result can be acquired by OR'ing these two components. This is shown in the following formula.

$S=S_{CHI}$ OR $S_{Temp.\ Result}$

This method for determining L, G, and S is equally applicable for cases 1–3. In the case where C exponent is less than A*B exponent, the same calculations are performed, but because of the way the mask comes out, it is going to be all 1's and end up not choosing anything from the CHI bus. In the Big C case, this method works for selecting the Lbit, since the mask will be all 0's, and the Lbit will be selected from the CHI bus. In this case, G and S are a special case. G is always set to 0 or 1, depending on the sign relationship between C and A*B, and S is set to the OR of all bits in the A*B bus. In other words, the method of the present invention can be generally used when adding the C addend to the A*B product for cases 1–3, and is applicable to selecting the Lbit in the Big C case.

Figure 6A:
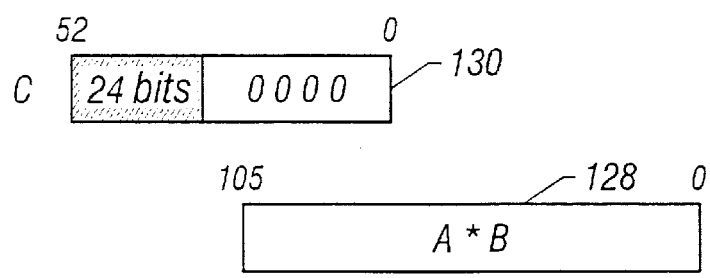
FIG. 6A shows C and A*B when the inputs are in single precision with extended precision hardware.
Figure 6B:
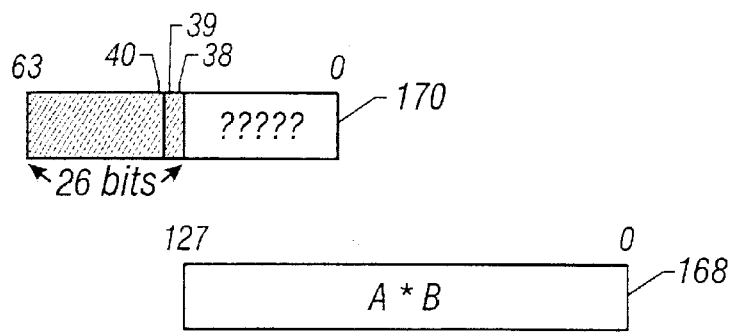
FIG. 6B shows C and A*B when the inputs are in extended precision and the result is to be rounded to single precision.
Figure 7:
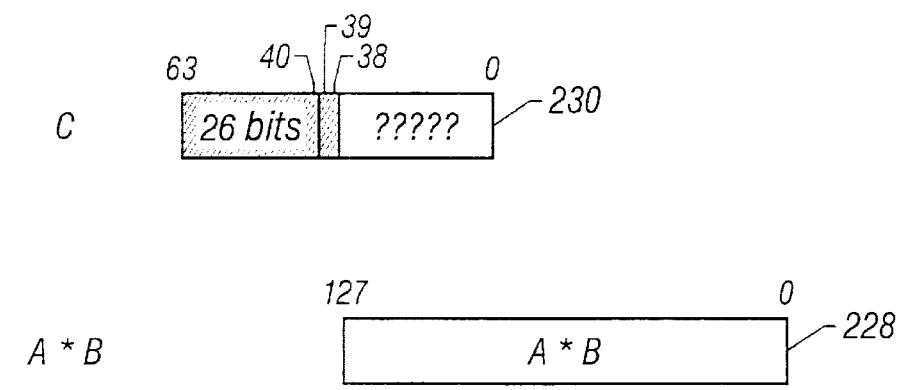
FIG. 7 shows an example of the flow of data when the merge mask is used to select the rounding parameters for rounding to a single precision mantissa when the inputs are in extended precision.
Figure 7:
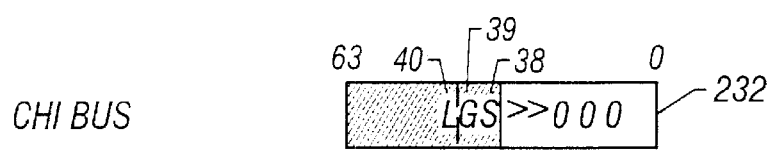
Figure 7:
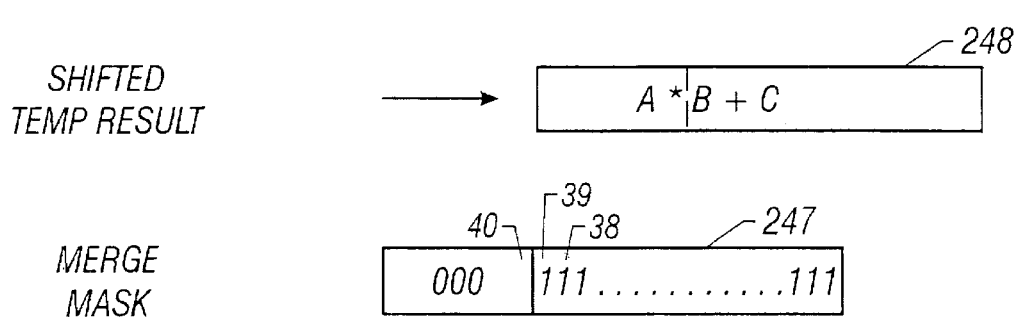

FIG. 7 shows the operation for deriving L, G, and S for the example of FIG. 6B. An A*B register 228 and C register 230 are shown. The registers are 128 and 64 bit extended precision registers, respectively, with bit positions increasingly numbered from right to left. The result is to be rounded to single precision (24 bits). In this example, C's exponent is greater than A*B's exponent by 26. Thus, bits 38 through 63 of C 230 fall off to the left of A*B 228. These bits are stored in the CHI register 232. The C bus is shifted to align with A*B for in order to be added therewith. The result of this addition is stored in the Temp Result (A*B+C) 246, and then shifted, as is shown at Shifted Temp. Result 248. It can be seen that L and G come from CHI and are at bit locations 40 and 39, respectively, which are the Lbit and Gbit values for single precision. The sticky comes from both the CHI bus and the Temp. Result and corresponds to bit positions 38 and downward.

Thus, with the above formulas for L and G, L=( CHI40] AND NOT Mask[40]) OR (Temp Result[40] AND Mask [40]). Likewise, G=(CHI[39] AND NOT Mask[39]) OR (Temp Result[39] AND Mask[39]). Since the merge mask is 0 (for selecting CHI) at bits 40 and 39, L will be selected from CHI at bit 40, and G will be selected from CHI at bit 39. Sticky, S will be the result of CHI[38] OR'ed with the sticky computed from the Temp. Result register 246, which is the OR of all bits in the Temp. Result register 246 corresponding to bits 37 of the result and all those to the right.

It should be noted the traditional Big C shortcuts can still be used when an actual Big C case exists, i.e., when the whole C register sufficiently exceeds the A*B register so that there is no interaction between C and A*B. With extended precision hardware, this approximately occurs when EXP (C)–EXP(A*B) is greater than 65. (This may not be true depending on the actual way the mantissa is stored, e.g., sign effects, etc.) With an actual Big C case, it is preferred to use the solution as in the prior art which is L being the least significant bit of the C register (C bus unshifted, G being 0 or 1, depending on the sign relationship between C and A*B, and S being determined by OR'ing the A*B register.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In a floating-point multiply accumulate unit for performing the accumulate operation (A*B)+C, wherein A, B, and C each comprise an m-bit mantissa and an exponent, and an (A*B) result comprises a "2m+1"-bit mantissa and an exponent, a method of adding C to the (A*B) result to acquire a final mantissa result that is rounded to a lower precision, comprising:

comparing the exponents of (A*B) and C to determine whether there is an overlapping range of the (A*B) and C mantissas;

transferring any part of the C mantissa which exceeds a range of the (A*B) mantissa to a CHI register;

shifting any part of the C mantissa which overlaps the range of the (A*B) mantissa, so as to align the bits of the (A*B) and C mantissas according to their respective magnitudes;

adding the shifted part of the C mantissa to the (A*B) mantissa to generate a Temp. Result;

if a portion of the C mantissa was transferred to the CHI register, shifting one or more least significant bits corresponding to a number of bits transferred to the CHI register out of the Temp. Result;

merging with a merge mask the bits of the C mantissa which were transferred to the CHI register with one or more most significant bit positions of the shifted Temp. Result to generate an accumulated mantissa result;

acquiring a leading bit (L) from a selected one of an Lbit value of the CHI register and an Lbit value of the Temp. Result based on the bit value of the merge mask corresponding to the Lbit position; and rounding the mantissa result to the lower precision using one or more rounding parameters including said leading bit (L).

2. The method of claim 1 wherein the lower precision is single precision and the Lbit of a register corresponds to bit (m-24) in the register.

3. The method of claim 1 wherein the lower precision is double and the Lbit of a register is bit (m-53).

4. The method of claim 1 wherein the one or more rounding parameters includes a guard bit (G).

5. The method of claim 4 further comprising the act of acquiring G from a selected one of a Gbit value of the CHI register and a Gbit value of the Temp. Result based on a Gbit value of the merge mask.

6. The method of claim 5 wherein the lower precision is single precision and the Gbit of a register corresponds to bit (m-23) in the register.

7. The method of claim 5 wherein the lower precision is double and the Gbit of a register is bit (m-52).

8. The method of claim 1 wherein the one or more rounding parameters includes a sticky (S) value.

9. The method of claim 8 further comprising filling less significant bits of the CHI register with 0's based on the merge mask; wherein the S parameter is derived from OR'ing the lower bits of the CHI register starting from the Sbit of the CHI register when the Sbit value of the CHI register is merged into the result mantissa.

10. The method of claim 9 wherein S is derived from OR'ing the bits of the Temp. Result if a real Big C case is identified.

11. The method of claim 8 further comprising filling less significant bits of the CHI register with 0's based on the merge mask; wherein the S parameter is derived from OR'ing the lower bits of the CHI register starting from the Sbit of the CHI register when the Sbit value of the CHI register is merged into the result mantissa.

12. The method of claim 11 wherein S is derived from OR'ing the bits of the Temp. Result if a real Big C case is identified.

13. In a floating-point multiply accumulate unit for performing the accumulate operation (A*B)+C, wherein A, B, and C each comprise an m-bit mantissa and an exponent, and an (A*B) result comprises a "2m+1"-bit mantissa and an exponent, a method of adding C to the (A*B) result to acquire a final mantissa result that is rounded to a lower precision, comprising:

comparing the exponents of (A*B) and C to determine whether there is an overlapping range of the (A*B) and C mantissas;

transferring any part of the C mantissa which exceeds a range of the (A*B) mantissa to a CHI register;

shifting any part of the C mantissa which overlaps the range of the (A*B) mantissa, so as to align the bits of the (A*B) and C mantissas according to their respective magnitudes;

adding the shifted part of the C mantissa to the (A*B) mantissa to generate a Temp. Result;

if a portion of the C mantissa was transferred to the CHI register, shifting one or more least significant bits corresponding to a number of bits transferred to the CHI register out of the Temp. Result;

merging with a merge mask the bits of the C mantissa which were transferred to the CHI register with one or more most significant bit positions of the shifted Temp. Result to generate an accumulated mantissa result;

acquiring a leading bit (L) from a selected one of an Lbit value of the CHI register and an Lbit value of the Temp. Result based on the bit value of the merge mask corresponding to the Lbit position; and rounding the mantissa result to the lower precision using one or more rounding parameters including said leading bit (L), a guard bit (G), and a sticky value (S).

14. The method of claim 13 wherein the lower precision is single precision and the Lbit of a register corresponds to bit (m-24) in the register.

15. The method of claim 13 wherein the lower precision is double and the Lbit of a register is bit (m-53).

16. The method of claim 13 further comprising the act of acquiring G from a selected one of a Gbit value of the CHI register and a Gbit value of the Temp. Result based on a Gbit value of the merge mask.

17. The method of claim 16 wherein the lower precision is single precision and the Gbit of a register corresponds to bit (m-23) in the register.

18. The method of claim 16 wherein the lower precision is double and the Gbit of a register is bit (m-52).

19. A floating-point multiply accumulate unit for performing the accumulate operation (A*B)+C, wherein A, B, and C each comprise an m-bit mantissa and an exponent, and an (A*B) result comprises a "2m+1"-bit mantissa and an exponent, comprising:

means for comparing the exponents of (A*B) and C to determine whether there is an overlapping range of the (A*B) and C mantissas;

means for transferring any part of the C mantissa which exceeds a range of the (A*B) mantissa to a CHI register;

means for shifting any part of the C mantissa which overlaps the range of the (A*B) mantissa, so as to align the bits of the (A*B) and C mantissas according to their respective magnitudes;

means for adding the shifted part of the C mantissa to the (A*B) mantissa to generate a Temp. Result;

means for shifting one or more least significant bits corresponding to a number of bits transferred to the CHI register out of the Temp. Result if a portion of the C mantissa was transferred to the CHI register;

means for merging with a merge mask the bits of the C mantissa which were transferred to the CHI register with one or more most significant bit positions of the shifted Temp. Result to generate an accumulated mantissa result;

means for acquiring a leading bit (L) from a selected one of an Lbit value of the CHI register and an Lbit value of the Temp. Result based on the bit value of the merge mask corresponding to the Lbit position; and means for rounding the mantissa result to a lower precision than the m-bit precision using one or more rounding parameters including said leading bit (L).

* * * * *